Oct. 13, 1925.

R. W. RYON

POULTRY FOUNTAIN

Filed Jan. 22, 1925

INVENTOR.
R. W. Ryon,
By Bertha J. Ryon, Admix
ATTORNEYS.

Oct. 13, 1925. 1,557,502
R. W. RYON
POULTRY FOUNTAIN
Filed Jan. 22, 1925 2 Sheets-Sheet 2

INVENTOR.
R. W. Ryon,
by Bertha J. Ryon Admix.
ATTORNEYS.

Patented Oct. 13, 1925.

1,557,502

UNITED STATES PATENT OFFICE.

ROBERT W. RYON, DECEASED; BY BERTHA J. RYON, ADMINISTRATRIX, OF MANCHESTER, KANSAS.

POULTRY FOUNTAIN.

Application filed January 22, 1925. Serial No. 4,070.

*To all whom it may concern:*

Be it known that ROBERT W. RYON, deceased, by BERTHA J. RYON, administratrix, citizen of the United States, residing at Manchester, in the county of Dickinson and State of Kansas, has invented certain new and useful Improvements in Poultry Fountains, of which the following is a specification, reference being had therein to the accompanying drawings.

This invention relates to poultry fountains, and has for its object the production of an efficient and durable apparatus for watering poultry.

Another object of my invention is the construction of an efficient, pivotally-mounted drinking cup, which is an important part of my complete apparatus.

With the foregoing and other objects in view, my invention comprises certain combinations, constructions and arrangement of parts as will be illustrated in the accompanying drawings, described in the following specification, and more particularly pointed out in the appended claims.

Figure 1:
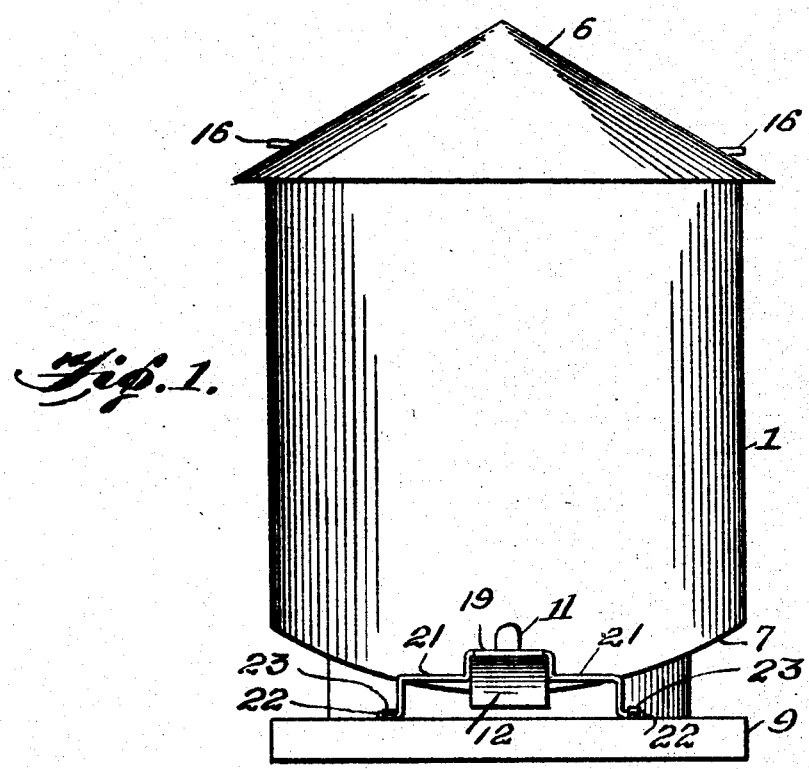
Figure 1 is a view in front elevation of an apparatus constructed in accordance with the present invention.

Referring to the drawings by numerals, 1 designates the outer drum and 2 is the inner drum.

In the upper part of drum 2 is a hopper-like partition 3, having a cylindrical valve seat 4 in its lower portion. A suitable packing 5 is placed between drums 1 and 2. A cover 6 is placed upon the outer drum 1, covering both drums.

The outer drum 1 has a rounded bottom 7, resting upon a ring 8, which ring rests upon a support 9. The support 9 is preferably formed of wood. The inner drum 2 has an inclined bottom 10 which allows the water to pass out through the feed or discharge pipe 11 into the drinking cup 12.

Figure 3:
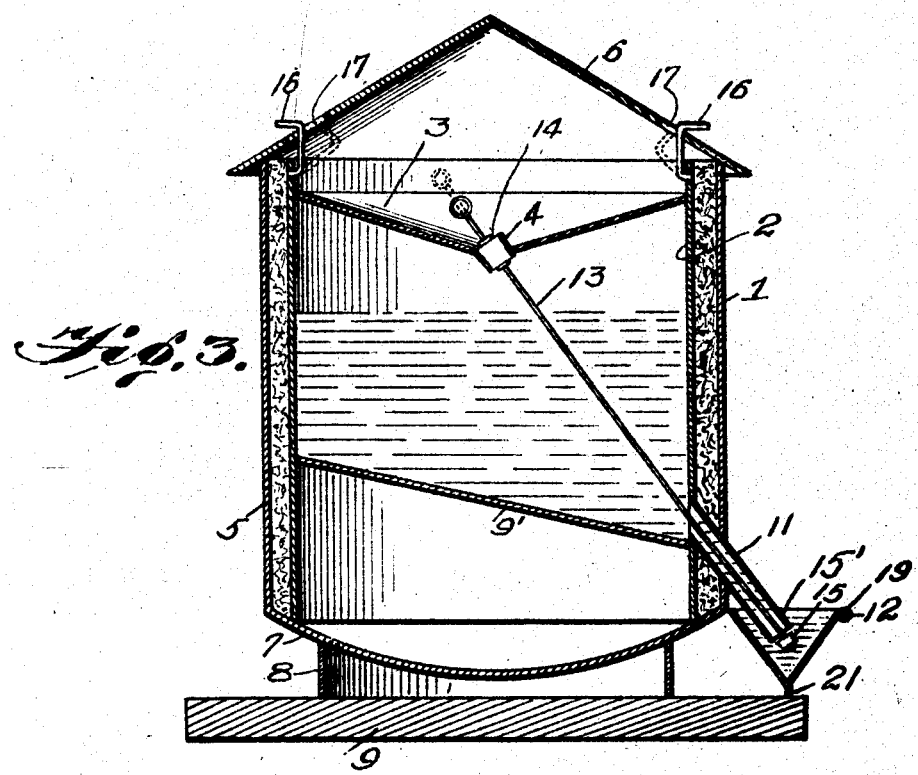
Figure 3 is a vertical central sectional view of the apparatus.

A rod 13 extends through pipe 11, part of drum 2 and through cylindrical valve seat 4. A valve plug 14 is fastened to rod 13 so as to be normally seated in seat 4. A second valve plug 15 is fastened to the lower end of rod 13 (Fig. 3). When valve plug 14 is seated in seat 4 then valve plug 15 is in an open position allowing water to flow in to cup 12. When it is desired to fill drum 2, the operator pulls up on the rod 13 closing pipe 11 and "opening" partition 3.

Pipe 11 is provided with an aperture 15', near its lower end, to allow air to pass in to drum 2, when water is low in cup 12, whereupon water will promptly flow in to cup 12, filling the same and sealing or closing (with water) said aperture 15'. Inasmuch as the aperture 15 does not permit air to pass into drum 2 until the water is below said aperture, no dirt is returned by suction to the pipe 11 or said inner drum 2, making it sanitary.

Referring to Figure 3: A pair of substantially U-shaped spring catches 16 is employed to hold the cover 6 upon the drums. Each catch 16 has its lower short end secured in the wall of drum 2, while its long upper end normally projects through an elongated slot 17 formed in the cover 6. By pushing the catches 16 in, to clear the slots 17, the cover may be removed.

Figure 2:
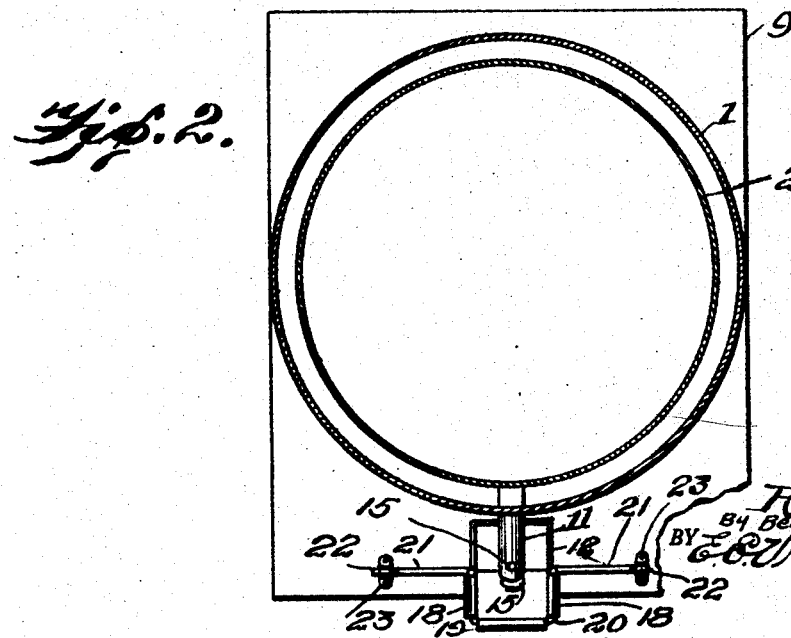
Figure 2 is a horizontal sectional view of the apparatus, looking towards the bottom of the same.
Figure 4:
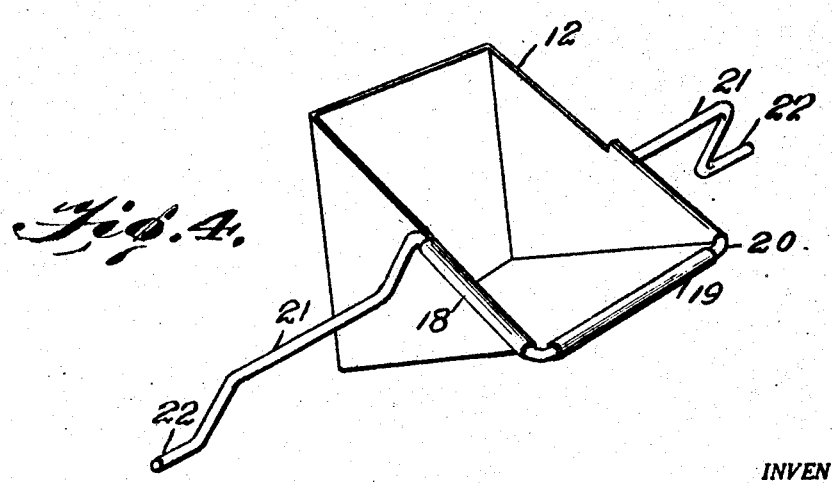
Figure 4 is a perspective view of the pivotally-mounted drinking cup.

The drinking cup 12 is preferably V-shaped or hopper shaped to better swing under the discharge end of pipe 11. This cup is provided with rolled edges 18 (Fig. 4) upon its sides, and with a front rolled edge 19. In these rolled edges or flanges 18 and 19 is a wire 20, forming a frame around part of the cup and reinforcing the same. This wire frame 20 has integral angle arms 21 extending laterally from the cup, with fingers 22 journaled in bearings 23 fastened to support 9 (Figs. 1 and 2). The cup 12, with the lower end of pipe 11 extending down into the same, is normally kept upright, or in a water-retaining position.

Upon the operator releasing the cup, it being so well balanced, said cup will swing to its normal position, as is shown in the drawings.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alteration or changes as shall fairly fall within the scope of the appended claims.

What I claim is:

1. In an apparatus of the class described, the combination of an inner drum with a hopper like partition, a cylindrical valve seat in said partition, an outer drum around said inner drum, a discharge pipe in alignment with said valve seat and extending from said inner drum through said outer drum, a rod extending through said pipe and said valve seat, valve plugs on said rod for closing said valve seat and said discharge pipe, one of said valve plugs being in closed position while the other plug is in an open position, means for receiving water from said discharge pipe, and a cover over said drums.

2. In an apparatus of the class described, the combination of an inner and an outer drum, packing between said drums, a discharge pipe for said inner drum, a valve for said pipe, a partition provided with a valve opening in said inner drum, a valve for closing said opening, and means for simultaneously operating said valves for moving one to an open position and one to a closed position.

3. In an apparatus of the class described, the combination of an inner and an outer drum, a partition provided with an inclined cylindrical valve seat in said inner drum, an inclined discharge pipe communicating with said inner drum and extending through and beyond said outer drum, said discharge pipe in direct alignment with the longitudinal axes of said cylindrical valve seat, valve means for closing said discharge pipe and said cylindrical valve seat, and manually-operated means in both valve seat and discharge pipe and connected to all of said valve means for simultaneously operating the same.

4. In an apparatus of the class described, the combination of a drinking cup provided with a front and side rolled edges or flanges, a wire frame in said rolled edges, angle arms integral with said frame and extending outwardly from said cup, fingers on the outer ends of said arms, means pivotally supporting said fingers, and means for supplying liquid or water to said cup.

5. In an apparatus of the class described, the combination of a drinking cup provided with rolled edges, a wire in said rolled edges, said wire terminating in outwardly extending arms, said arms provided with fingers, a support, means journalling said fingers upon said support, and means for supplying water to said cup.

6. In an apparatus of the class described, the combination of a drum, a discharge pipe extending from said drum, said pipe provided with an aperture near its discharge end, and a cup enclosing said discharge end and apertured portion of the pipe for receiving water to seal the discharge pipe.

In testimony whereof I hereunto affix my signature.

ROBERT W. RYON,
*Deceased.*
By BERTHA J. RYON,
*Administratrix.*